US005473333A

United States Patent [19]

Chiba et al.

[11] Patent Number: 5,473,333

[45] Date of Patent: Dec. 5, 1995

[54] APPARATUS AND METHOD FOR ADAPTIVELY CONTROLLING ARRAY ANTENNA COMPRISING ADAPTIVE CONTROL MEANS WITH IMPROVED INITIAL VALUE SETTING ARRANGEMENT

[75] Inventors: Isamu Chiba, Nara; Ryu Miura, Kyoto; Yoshio Karasawa, Nara, all of Japan

[73] Assignee: ATR Optical & Radio Communications Research Laboratories, Kyoto, Japan

[21] Appl. No.: 368,633

[22] Filed: Jan. 4, 1995

[30] Foreign Application Priority Data

Mar. 3, 1994 [JP] Japan .................................... 6-033489

[51] Int. Cl.[6] ................................ G01S 3/16; G01S 3/28

[52] U.S. Cl. ........................................... 342/378; 342/157

[58] Field of Search .................................... 342/378, 372, 342/157, 81

[56] References Cited

U.S. PATENT DOCUMENTS

| | | |
|---|---|---|
| 4,492,962 | 1/1985 | Hansen . |
| 4,996,532 | 2/1991 | Kirimoto et al. . |
| 5,087,917 | 2/1992 | Fujisaka et al. . |
| 5,181,040 | 1/1993 | Inoue et al. . |
| 5,283,587 | 2/1994 | Hirshfield et al. . |
| 5,396,256 | 3/1995 | Chiba et al. . |

FOREIGN PATENT DOCUMENTS

| | | |
|---|---|---|
| 167187 | 7/1988 | Japan . |
| 167288 | 7/1988 | Japan . |

OTHER PUBLICATIONS

K. Teitelbaum, "A Flexible Processor for a Digital Adaptive Array Radar", pp. 103–107, Proceedings of the 1991 IEEE National Radar Conference, Mar. 12–13, 1991.

T. Ohkane et al, "Characteristics of CMA Adaptive Array for Selective Fading Compensation in Digital Land Mobile Radio Communications", vol. J73–B–11, No. 10, pp. 489–497, Oct. 1990, together with a partial English translation thereof.

I. Chiba et al, "Null Beam Forming by Phase Control of Selected Elements in Phased–Array Antennas", vol. J74–B–11, No. 1. pp. 35–42, Jan. 1991, with English translation.

N. Kuroiwa et al, "Design of a Directional Diversity Receiver Using an Adaptive Array Antenna", vol. J73–B–11, No. 11, pp. 755–763, Nov. 1990, with English translation.

*Primary Examiner*—Theodore M. Blum

[57] ABSTRACT

In an apparatus for adaptively controlling an array antenna of M antenna elements, a multi-beam forming circuit calculates N beam field strengths in a known manner, and a beam selecting circuit selectively outputs beam field strengths not smaller than a predetermined threshold value by comparing the N beam field strengths with the threshold value. At least two adaptive control processors calculate N weight coefficients corresponding to N beams according to a constant modulus algorithm, respectively multiplies the calculated beam field strengths by the calculated N weight coefficients, and combines in phase respective signals of multiplication results, outputting the combined signal as a reception signal. In an initial state of one adaptive control processor, a weight coefficient thereof corresponding to the maximum beam field strength is set to a predetermined initial value not zero, and weight coefficients corresponding to the other beam field strengths are set to zero. In an initial state of the other adaptive control processor, a weight coefficient of the other adaptive control processor corresponding to at least a beam field strength having the second greater level is set to the initial value, and weight coefficients corresponding to the other beam field strengths is set to zero.

3 Claims, 6 Drawing Sheets

APPARATUS AND METHOD FOR ADAPTIVELY CONTROLLING ARRAY ANTENNA COMPRISING ADAPTIVE CONTROL MEANS WITH IMPROVED INITIAL VALUE SETTING ARRANGEMENT

BACKGROUND OF THE INVENTION

1. Field of the Invention

The present invention relates to an apparatus and a method for adaptivety controlling an array antenna, and in particular, to an apparatus and a method for adaptively controlling an array antenna composed of a plurality of antenna elements, comprising an adaptive control means with an improved initial value setting arrangement.

2. Description of the Related Art

In order to establish higher communication quality in mobile communication, it is required to provide a function of always capturing a desired wave as well as another function of removing frequency-selective fading occurring in a multi-path propagation. For the latter function, it is known to those skilled in the art that, for example, the constant modulus algorithm (referred to as the "CM algorithm" hereinafter) is effective in removing an unnecessary wave which is a delayed wave having correlation with a desired wave (See, for example, Ohkane et al., "Characteristics of CMA Adaptive Array for Selective Fading Compensation in Digital Land Mobile Radio Communications", The Institute of Electronics Information and Communication Engineers in Japan, Transactions, Vol. J73-B-II, No. 10, pp 489–497, October in 1990 (referred to as Reference 1 hereinafter).)

Prior to the processing according to the CM algorithm, the following beam forming process and beam selecting process which are known to those skilled in the art are executed. 10

(a) Beam forming process: a plurality of N beam electric field strength $E_n$ (an electric field strength is referred to as a field strength hereinafter) are calculated based on a plurality of M reception signals received by respective antenna elements of an array antenna, directions of respective main beam of a predetermined plurality of N beams to be formed which have been previously determined so that a desired wave can be received in a predetermined range of radiation angle, and a reception frequency fr of the reception signals.

(b) Beam selecting process: By comparing the above-mentioned plurality of N beam field strengths calculated in the beam forming process with a predetermined threshold value, only beam field strengths greater than the threshold value is selected and then outputted.

According to the above-mentioned CM algorithm, based on the plurality of N or less beam field strengths selected by the beam selecting process, there are calculated a plurality of N weight coefficients $w_n$ ($n=1, 2, \ldots, N$) for the reception signal corresponding to respective beams, so that the main beam of the array antenna is directed toward a desired direction of a desired wave and also the received signal levels in arrival directions of unnecessary waves such as interference waves or the like become zero. In other words, the CM algorithm is to make the received signal level in the radiation pattern of the array antenna in the arrival directions of the unnecessary waves such as interference waves or the like by converting a waveform of an envelope changing due to an influence of the unnecessary waves into a desired waveform in a communication system using a signal of the desired wave whose envelope is known, as described in detail hereinafter.

In a conventional array antenna using an adaptive control algorithm such as the above-mentioned CM algorithm or the like, the influence of the delayed wave can be removed by adaptively controlling the directivity of the antenna, however, the delayed wave is merely removed and is not utilized. In order to give solution to the above-mentioned problem, a method for diversity-receiving signals with separating a direct wave and a delayed wave is disclosed, for example, in Kuroiwa et al., "Design of a Directional Diversity Receiver Using an Adaptive Array Antenna", The Institute of Electronics Information Communication Engineers in Japan, Transactions, Vol. J73-B-II, No. 11, pp 755–763, November in 1990) (referred to as a "conventional example" hereinafter.)

In the conventional example, the diversity reception is achieved by separating a direct wave and a delayed wave from signals received in the following procedure.

(a) Only the direct wave is taken out according to the conventional adaptive control algorithm.

(b) Then an adaptive equalizer is made to operate using the direct wave thus taken out as a reference signal to take out only the delayed wave.

(c) Finally, the diversity reception is achieved by multiplying the direct wave and the delayed wave, which have been thus taken out, respectively, by weight coefficients, so as to obtain the maximum signal-to-noise ratio.

However, the conventional example has the following problems.

(a) The conventional adaptive control algorithm is used and the adaptive equalizer is made to operate after satisfying a predetermined convergence condition in the process according to the above-mentioned algorithm, and this results in relatively increase in the time required for the adaptive control process.

(b) It is required to provide different processing units of, for example, a CMA processor and the adaptive equalizer, and then this results in a complicated hardware structure.

SUMMARY OF THE INVENTION

An essential object of the present invention is therefore to provide an apparatus for adaptively controlling an array antenna comprised of a plurality of antenna elements, having a structure simpler than that of the conventional example which is capable of remarkably reducing the time required for the above-mentioned adaptive control process.

Another object of the present invention is to provide a method for adaptively controlling an array antenna comprised of a plurality of antenna elements, having a structure simpler than that of the conventional example which is capable of remarkably reducing the time required for the above-mentioned adaptive control process.

In order to achieve the above-mentioned objective, according to one aspect of the present invention, there is provided an apparatus for adaptively controlling an array antenna comprised of a predetermined plurality of M antenna elements arranged closely to each other in a predetermined arrangement form, comprising:

multi-beam forming means for calculating a predetermined plurality of N beam field strengths based on a plurality of M reception signals received by the antenna elements of the array antenna, directions of respective main beams of a plurality of N beams to be formed which have been predetermined so that a desired wave can be received in a predetermined radiation angle, and a reception frequency of the reception signals;

beam selecting means for selectively outputting beam field strengths equal to or greater than a predetermined threshold value by comparing said plurality of N beam field strengths calculated by said multi-beam forming means, with the predetermined threshold value; and at least two adaptive control means for calculating a plurality of N weight coefficients for the reception signals corresponding to a plurality of N beams based on the beam field strengths outputted from said beam selecting means according to a constant modulus algorithm, respectively multiplying the calculated beam field strengths by a plurality of calculated N weight coefficients, combining in phase respective signals of multiplication results obtained by said multiplication, and outputting the combined signal as a reception signal;

first initial value setting means for, in a predetermined initial state of said one adaptive control means, setting a weight coefficient of one adaptive control means corresponding to the maximum beam field strength among the beam field strengths outputted from said beam selecting means to a predetermined initial value being not zero, and setting weight coefficients corresponding to the other beam field strengths to zero; and second initial value setting means for, in a predetermined initial state of said other adaptive control means, setting a weight coefficient of said other adaptive control means corresponding to at least a beam field strength having the second greater level among the beam field strengths outputted from said beam selecting means to the predetermined initial value, and setting weight coefficients corresponding to the other beam field strengths to zero.

The above-mentioned control apparatus preferably further comprises:

synchronizing signal detecting means for detecting synchronizing signals in response to the reception signals outputted from said adaptive control means; and combining means for combining in phase the reception signal outputted from said one adaptive control means with the reception signal outputted from said other adaptive control means so as to perform a diversity reception based on the synchronizing signals detected by said synchronizing signal detecting means.

According to another aspect of the present invention, there is provided a method for adaptively controlling an array antenna comprised of a predetermined plurality of M antenna elements arranged closely to each other in a predetermined arrangement form, including:

calculating a predetermined plurality of N beam field strengths based on a plurality of M reception signals received by the antenna elements of the array antenna, directions of respective main beams of a plurality of N beams to be formed which have been predetermined so that a desired wave can be received in a predetermined radiation angle, and a reception frequency of the reception signals;

selectively outputting beam field strengths equal to or greater than a predetermined threshold value by comparing said calculated plurality of N beam field strengths with the predetermined threshold value; and calculating a plurality of N weight coefficients for the reception signals corresponding to a plurality of N beams based on said selectively outputted beam field strengths outputted according to a constant modulus algorithm, respectively multiplying the calculated beam field strengths by a plurality of calculated N weight coefficients, combining in phase respective signals of multiplication results obtained by said multiplication, and outputting the combined signal as a reception signal;

in a predetermined initial state of one adaptive control means for performing said calculating a plurality of N weight coefficients step, setting a weight coefficient of said one adaptive control means corresponding to the maximum beam field strength among said selectively outputted beam field strengths to a predetermined initial value being not zero, and setting weight coefficients corresponding to the other beam field strengths to zero; and in a predetermined initial state of said other adaptive control means which is different from said one adaptive control means and performs said calculating a plurality of N weight coefficients step, setting a weight coefficient of said other adaptive control means corresponding to at least a beam field strength having the second greater level among said selectively outputted beam field strengths to the predetermined initial value, and setting weight coefficients corresponding to the other beam field strengths to zero. With the above-mentioned arrangement, the one adaptive control means or processor outputs the direct wave having the maximum beam field strength as a reception signal, while the other adaptive control means or processor outputs at least the delayed wave having a beam field strength having the second higher level as a reception signal. In other words, the direct wave and the delayed wave can be separately received.

When said control apparatus for the array antenna is further provided with the combining means, this results in obtaining the reception signal having a predetermined noise-to-signal power ratio for a time shorter than that of the conventional example.

Accordingly, the present invention has the following advantageous effects:

(a) since at least two adaptive control means or processors are required to separate the direct wave and at least one delayed wave, the hardware structure of the control apparatus becomes simpler than that of the conventional example; and (b) since the CM algorithm process can be executed by making a plurality of adaptive control means or processors operate in parallel in the time, a predetermined signal-to-noise ratio can be obtained with a calculation time shorter than the time required in the conventional example. In other words, although the adaptive equalizer is made to operate so as to obtain a predetermined signal-to-noise ratio after a predetermined condition of convergence is satisfied in the process according to the algorithm of the adaptive array antenna in the conventional example in the above-mentioned manner, the present preferred embodiment requires no operation of the adaptive equalizer, thereby reducing the time required for the adaptive control processing by the time for the operation.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Preferred embodiments according to the present invention will be described below with reference to the attached drawings.

Figure 1:
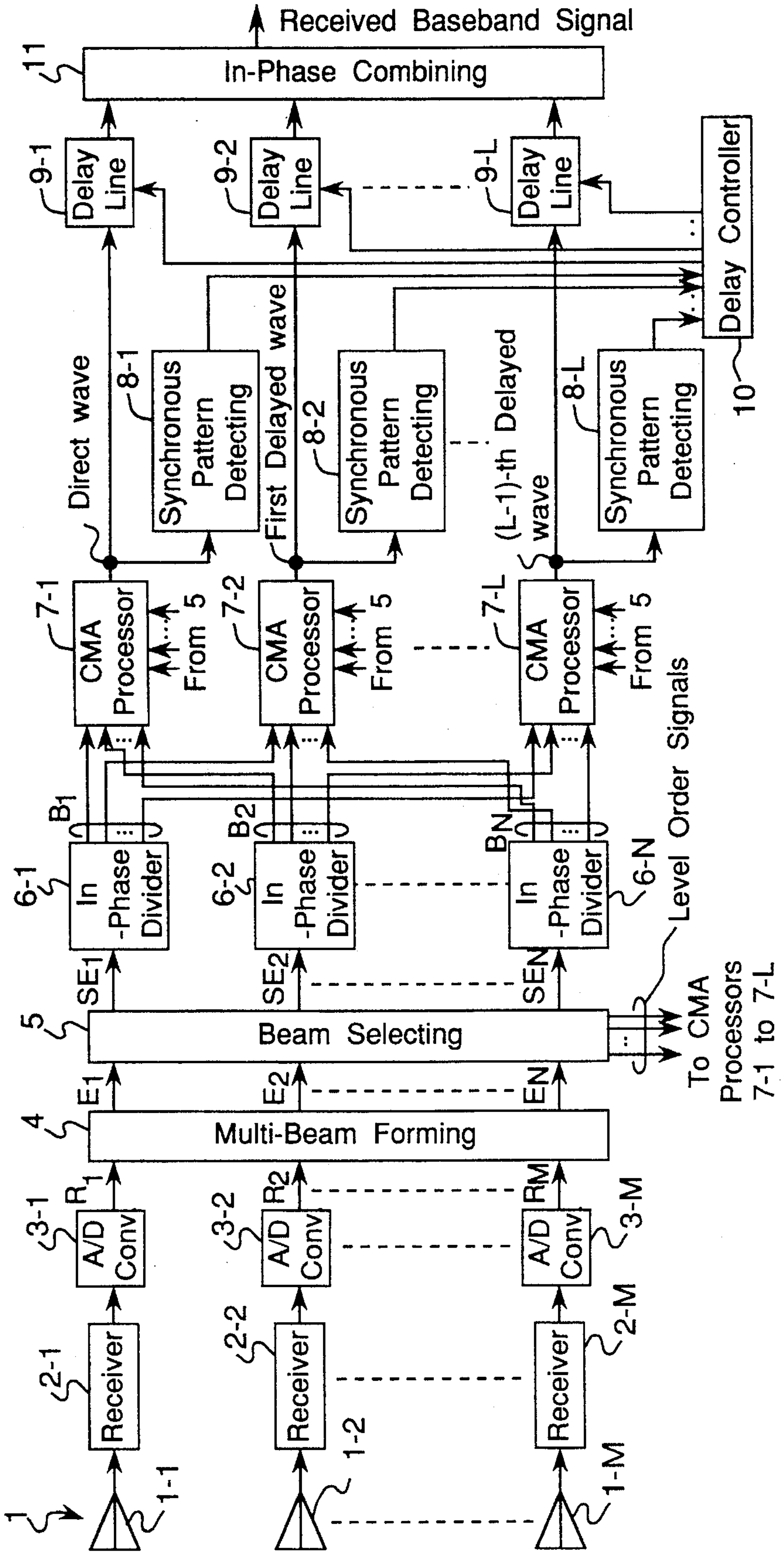
FIG. 1 is a block diagram of a control apparatus for an array antenna in accordance with a preferred embodiment of the present invention.

FIG. 1 is a block diagram of a control apparatus for an array antenna in accordance with a preferred embodiment of the present invention.

Referring to FIG. 1, the control apparatus of the present preferred embodiment is provided for controlling an array antenna 1 comprised of a predetermined plurality of M antenna elements 1-1 to 1-M which are arranged closely to each other in a predetermined arrangement form. This control apparatus is characterized in that it is provided with a plurality of L CMA processors 7-1 to 7-L (generally denoted by the reference numeral 7 hereinafter) for effecting a process according to the CM algorithm on a reception signal which has undergone a multi-beam forming process and a beam selecting process, a direct wave and a plurality of (L-1) delayed waves are separately received by adjusting initial values of the CMA processors 7-1 to 7-L at the time of starting calculations thereof, and the above-mentioned signals are combined in phase to obtain a received baseband signal.

In the present preferred embodiment, the reception signal is a digital data signal which is digitally modulated according to, for example, an audio signal, a video signal, or a data signal and which includes a synchronous pattern signal.

In the present preferred embodiment, it is assumed that a plurality of M antenna elements 1-1 to 1-M are aligned at predetermined intervals on a straight line.

Referring to FIG. 1, each of receivers 2-1 to 2-M includes a frequency converter and a demodulator, and the receivers 2-1 to 2-M are constituted in the same manner to each other. Each of analog to digital converters (referred to as an A/D converters hereinafter) 3-1 to 3-M converts a received analog reception signal into a digital reception signal, and the A/D converters 3-1 to 3-M are constituted in the same manner to each other.

In the this case, a reception signal received by the antenna element 1-1 is inputted as a digital reception signal $R_1$ to a multi-beam forming circuit 4 through the receiver 2-1 and the A/D converter 3-1, while a reception signal received by the antenna element 1-2 is inputted as a digital reception signal $R_2$ to the multi-beam forming circuit 4 through the receiver 2-2 and the A/D converter 3-2. In the same manner as above, a reception signal received by the antenna element 1-M is inputted as a digital reception signal $R_2$ to the multi-beam forming circuit 4 through the receiver 2-M and the A/D converter 3-M.

In the preferred embodiment, the sampling frequency of each of the A/D converters 3-1 to 3-M is preferably set in a manner as follows so that the sampling frequency is about eight times the bandwidth of the transmission signal.

(a) When the transmission signal is, for example, an audio signal having a bandwidth of 16 kHz, the sampling frequency is set to 128 kHz.

(b) When the transmission signal is, for example, a data signal having a bandwidth of 100 MHz, the sampling frequency is set to 800 MHz.

A multi-beam forming circuit 10 receives a plurality of M reception digital signals from the A/D converters 3-1 to 3-M, and calculates respective beam field strengths $E_n$ of a multi-beam composed of a plurality of N beams, and then outputting the resulting calculated beam field strengths $E_n$ to a beam selecting circuit 5 as follows. A plurality of N directions of respective beams of the multi-beam to be formed which correspond to the arrival direction of the desirable wave are previously determined, and these directions are represented by direction vectors $d_1, d_2, \ldots, d_N$ (generally denoted by $d_n$ hereinafter) when seen from a predetermined origin. In this case, N is the number of the direction vectors $d_n$ which are set so that the desired wave can be received by means of the array antenna 1, wherein the number N is preferably four or more and smaller than the number M of the antenna elements 1. When the antenna elements 1-1 to 1-M of the array antenna 1 are arranged, for example, in a form of 4×4 matrix as separated to each other by half wavelength on an X-Y plane, the center of the radiation direction is the Z-axis. In the present preferred embodiment, a radiation angle means an angle from the Z-axis on the X-Z plane. Further, position vectors $r_1, r_2, \ldots, r_M$ (generally represented by $r_m$ hereinafter) of the antenna elements 1-1 to 1-M of the array antenna 1 are previously determined as direction vectors when seen from the above-mentioned predetermined origin.

Then, according to the following Equation 1, the multi-beam forming circuit 4 calculates a plurality of N beam field strengths $E_n$ corresponding to the above-mentioned respective direction vectors $d_n$ represented by a combined electric field, and outputs digital data signals representing the calculated beam field strengths $E_n$ to the beam selecting circuit 5.

$$En = \sum_{m=1}^{M} \exp[j(a_{nm})] \cdot R_m,\ n = 1, 2, \ldots, N, \tag{1}$$

and $$a_{nm} = -(2\pi \cdot fr/c) \cdot (d_n \cdot r_m) \tag{2}$$

where c is the velocity of light, $(d_n \cdot r_m)$ is the inner product of the direction vector $d_n$ and the position vector $r_m$. Therefore, the phase $a_{nm}$ is a scalar quantity. Further, fr is a reception frequency of the reception signals.

Subsequently, in order to remove any reception signal having an extremely low received signal level and a deteriorated signal-to-noise ratio, the beam selecting circuit 5 compares a plurality of respective N beam field strengths $E_n$ outputted from the multi-beam forming circuit 4 with a threshold value predetermined according to the level of the side lobe of the array antenna 1, the processing speed of the adaptive control processor, and other factors, and outputs only the data signal of a beam field strength $SE_n$ (n=1, 2, . . . , N; wherein no data is outputted with respect to any beam field strength smaller than the threshold value) equal to or greater than the threshold value to in-phase dividers 6-1 to 6-N. The beam selecting circuit 5 further determines the order of the level of a plurality of N beam field strengths $E_n$ and respectively gives level order numbers to respective beam field strength $E_n$ in the ascending order sequentially from the beam field strength having the greatest level, and then outputs a plurality of N level order signals representing the level order numbers of the beam field strengths $E_n$ to the CMA processors 7-1 to 7-L.

Figure 2:
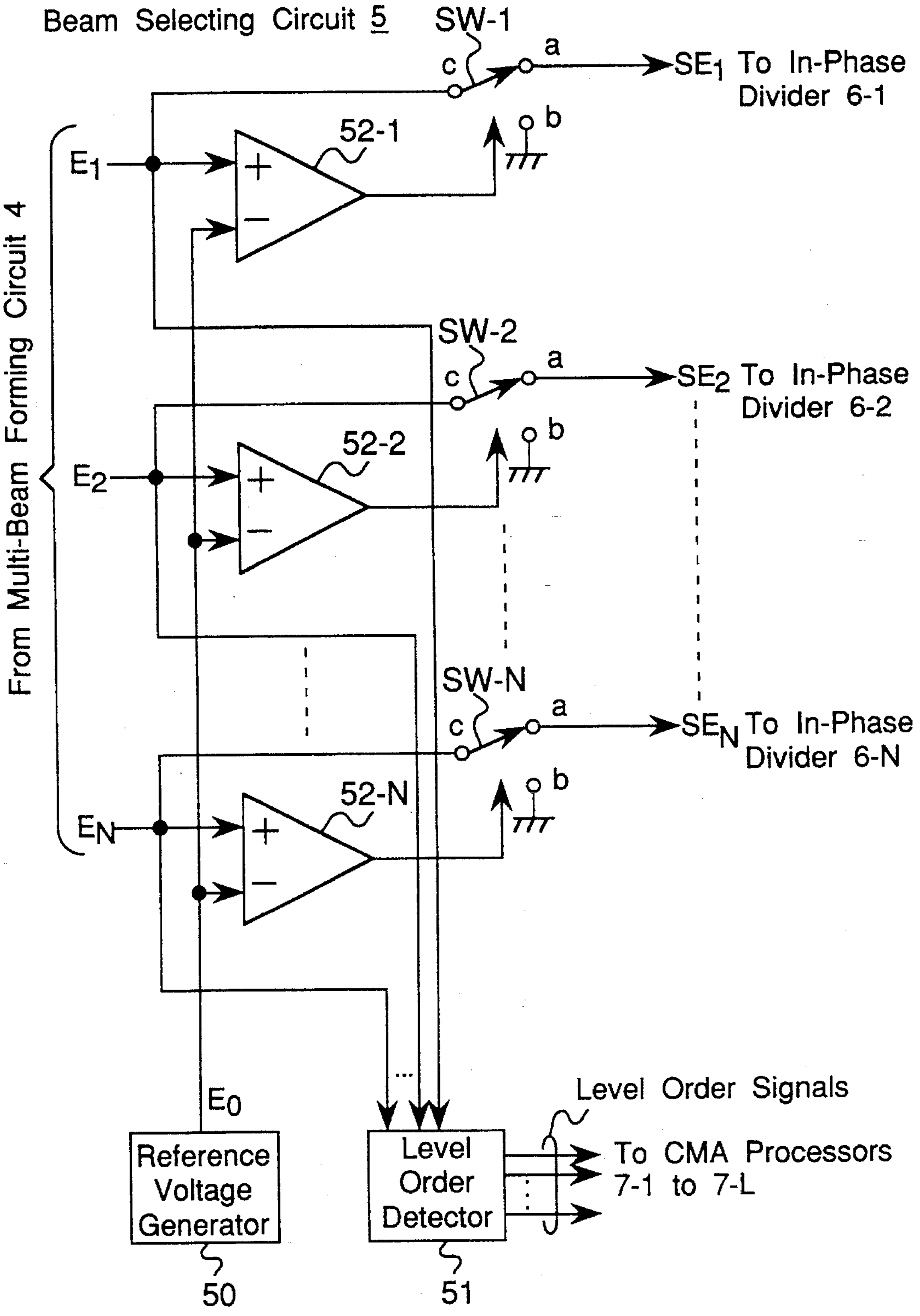
FIG. 2 is a block diagram of a beam selecting circuit 5 shown in FIG. 1.

FIG. 2 is a block diagram of the beam selecting circuit 5.

Referring to FIG. 2, the beam selecting circuit 5 comprises a reference voltage generator 50 which generates a predetermined reference voltage data signal $E_0$ corresponding to the predetermined threshold value for selecting the beams, and then outputs the resulting reference voltage data signal $E_0$ to inverted input terminals of comparators 52-1 to 52-N. The beam selecting circuit 5 further comprises a level order detector 51, a plurality of N comparators 52-1 to 52-N, and a plurality of N switches SW-1 to SW-N.

As shown in FIG. 2, the data signal of the beam field strength $E_1$ is inputted to a non-inverted input terminal of the comparator 52-1, a common terminal "c" of the switch SW-1, and the level order detector 51. The comparator 52-1 compares the inputted data signal of the beam field strength $E_1$ with the predetermined reference voltage data signal $E_0$. When $E_1 \geqq E_0$, a High level signal is outputted to a control terminal of the switch SW-1, thereby switching over the switch SW-1 to a contact point "a" thereof. Then the data signal of the beam field strength $E_1$ is outputted to the in-phase divider 6-1 through the switch SW-1. On the other hand, when $E_1<E_0$, the comparator 52-1 outputs a Low level signal to the control terminal of the switch SW-1, thereby switching over the switch SW-1 to a contact point "b" of the switch SW-1. Then the data signal of the beam field strength $E_1$ is grounded through the switch SW-1 and is not outputted to the in-phase divider 6-1.

The data signal of the beam field strength $E_2$ is inputted to a non-inverted input terminal of the comparator 52-2, a common terminal "c" of the switch SW-2, and the level order detector 51. The comparator 52-2 compares the inputted data signal of the beam field strength $E_2$ with the predetermined reference voltage data signal $E_0$. When $E_2 \geqq E_0$, the High level signal is outputted to a control terminal of the switch SW-2, thereby switching over the switch SW-2 to a contact point "a" thereof. Then the data signal of the beam field strength $E_2$ is outputted to the in-phase divider 6-2 through the switch SW-2. On the other hand, when $E_2<E_0$, the comparator 52-2 outputs the Low level signal to the control terminal of the switch SW-2 to switch the switch SW-2 to a contact point "b" of the switch SW-2. Then the data signal of the beam field strength $E_2$ is grounded through the switch SW-2 and is not outputted to the in-phase divider 6-2.

The comparators 52-3 to 52-(N-1) operate in the same manner as described above.

The data signal of the beam field strength $E_N$ is inputted to a non-inverted input terminal of the comparator 52-N, a common terminal "c" of the switch SW-N, and the level order detector 51. The comparator 52-N compares the input data signal of the beam field strength $E_N$ with the predetermined reference voltage data signal $E_0$. When $E_N \geqq E_0$, the High level signal is outputted to a control terminal of the switch SW-N, thereby switching over the switch SW-N to a contact point "a" thereof. Then the data signal of the beam field strength $E_N$ is outputted to the in-phase divider 6-N through the switch SW-N. On the other hand, when $E_N<E_0$, the comparator 52-N outputs the Low level signal to the control terminal of the switch SW-N, thereby switching the switch SW-N to a contact point "b" of the switch SW-N. Then the data signal of the beam field strength $E_N$ is grounded through the switch SW-N and not outputted to the in-phase divider 6-N.

The level order detector 51 further determines the order of the level of a plurality of N inputted beam field strengths $E_n$ (n=1, 2, . . . , N), respectively gives level order numbers to respective beam field strengths $E_n$ in the ascending order sequentially from the beam field strength having the greatest level, and outputs a plurality of all N resulting level order signals representing the level order numbers of the beam field strengths $E_n$ to the CMA processors 7-1 to 7-L.

Referring back to FIG. 1, the in-phase dividers 6-1 to 6-N and the circuits subsequent thereto will be described below.

Each of the in-phase dividers 6-1 to 6-N divides and distributes in phase the data signals of the beam field strengths $SE_n$ (n=1, 2, . . . , N) outputted from the beam selecting circuit 5 to a plurality of L data signals $B_n$ (n =1, 2, . . . , N) and outputs the same signals to the CMA processors 7-1 to 7-L. In other words, to each of the CMA processors 7-1 to 7-L are inputted the data signals of all the beam field strengths $E_n$ selected by the beam selecting circuit 5.

Then the respective CMA processors 7-1 to 7-L operate in parallel in the time, and according to the conventional CM algorithm as disclosed in, for example, the Reference 1, the CMA processors 7-1 to 7-L calculate a plurality of N weight coefficients $w_n$ (n=1, 2, . . . , N) for the reception signals corresponding to respective beams so that the main beam of the array antenna 1 is directed to the desired direction of the desired wave and the received signal levels in the arrival directions of the unnecessary waves such as interference waves or the like become zero based on the number N or less of beam field strengths selected by the above-mentioned beam selecting process, and then multiply the inputted data signals of the beam field strengths $B_n$ respectively by the corresponding calculated weight coefficients $w_n$. Each of the CMA processors 7-1 to 7-L further combines the resulting multiplied data signals in phase, and outputs the combined data signal.

In other words, the conventional CM algorithm for the adaptive control of the array antenna is to make the received signal level in the radiation pattern of the array antenna in the arrival directions of the unnecessary waves such as interference waves or the like by converting a waveform of an envelope changing due to an influence of the unnecessary waves into a desired waveform in a communication system using a signal of the desired wave whose envelope has been known, as described in detail hereinafter.

In this case, each of the CMA processors 7-1 to 7-L further reset the processing operation of the CM algorithm so as to set them to initial states at a time when the control apparatus is activated or when members of the beam field strength selected by the beam selecting circuit 5 changes due to change of the direction of the other party station which a transceiver connected to the control apparatus currently communicates with. A time of starting the calculations at this initial state is referred to as an initial state time hereinafter.

Then, by respectively adjusting the initial values at the above-mentioned initial state time according to the level order signals inputted from the beam selecting circuit 5, the CMA processor 7-1 generates and outputs the data signal representing the beam field strength of the direct wave, while the CMA processors 7-2 to 7-L respectively generate and output the data signals of the beam field strengths of the first to (L-1)-th delayed waves. In other words, the in-phase division number L of the in-phase dividers 6-1 to 6-N and the number L of the CMA processors 7-1 to 7-L are previously determined depending on whether or not the beam field strength of the maximum or (L-1)-th delayed wave is to be obtained.

Then the following describes a process according to the CM algorithm in the CMA processors 7-1 to 7-L. Assuming now that the reception signal at a time "t" of the n-th beam corresponding to the data signal of the beam field strength $B_n$ outputted from the in-phase dividers 6-1 to 6-N in the present preferred embodiment is $B_n^t$ (n=1, 2, . . . , N), a complex weight coefficient $w_n^t$ is to be applied to the reception signal $B_n^t$. In the present case, a combined electric field Y obtained through combining the reception signals by the array antenna 1 can be expressed by the following Equation 3. This combined electric field Y corresponds to an output signal of an in-phase combining circuit 73 shown in FIG. 3 described in detail hereinafter.

$$Y=\sum_{n=1}^{N} w_n^t \cdot B_n^t. \quad (3)$$

Assuming now that the desired envelope of the signal wave is a predetermined constant value $P_0$ for simplicity, calculation of the complex weight coefficient $w_n^t$ for making the envelope of the signal of the combined electric field be the constant value $P_0$ is equivalent to calculation of the complex weight coefficient $w_n^t$ for minimizing an evaluation function F in the following Equations 4 and 5 for the known reason.

$$F=(|Y|^2-P_0)^2 \quad (4).$$

When the combined electric field Y represented by the Equation 3 is substituted into the following Equation 4, the following Equation 5 can be derived.

$$F=\left( \left| \sum_{n=1}^{N} w_n \cdot B_n \right|^2 - P_0 \right)^2. \quad (5)$$

Therefore, by renewing the complex weight coefficient $w_n^t$ into a complex weight coefficient $w_n^{(t+1)}$ at the next time (t+1) according to the following Equation 6, the envelope of the signal wave can be formed into a desired form and the received signal levels in the array antenna radiation pattern in the arrival direction of the unnecessary waves is made zero.

$$w_n^{(t+1)}=w_n^t-\mu B_n^*\cdot(|Y|^2-P_0)\cdot Y \quad (6),$$

where $\mu$ is a constant determined depending on the system of the processing loop and preferably in a range of $1/100 \geqq \mu \geqq 1/10$, more preferably in a range of $1/30 \geqq \mu - 1/20$, and $B_n^*$ is the conjugate complex number of the reception signal $B_n$ represented by a complex number. According to the above-mentioned CM algorithm, the zero points of the number (N−1) obtained by subtracting the number 1 from the beam number N of the multi-beam can be formed in the radiation pattern for the known reason.

Figure 3:
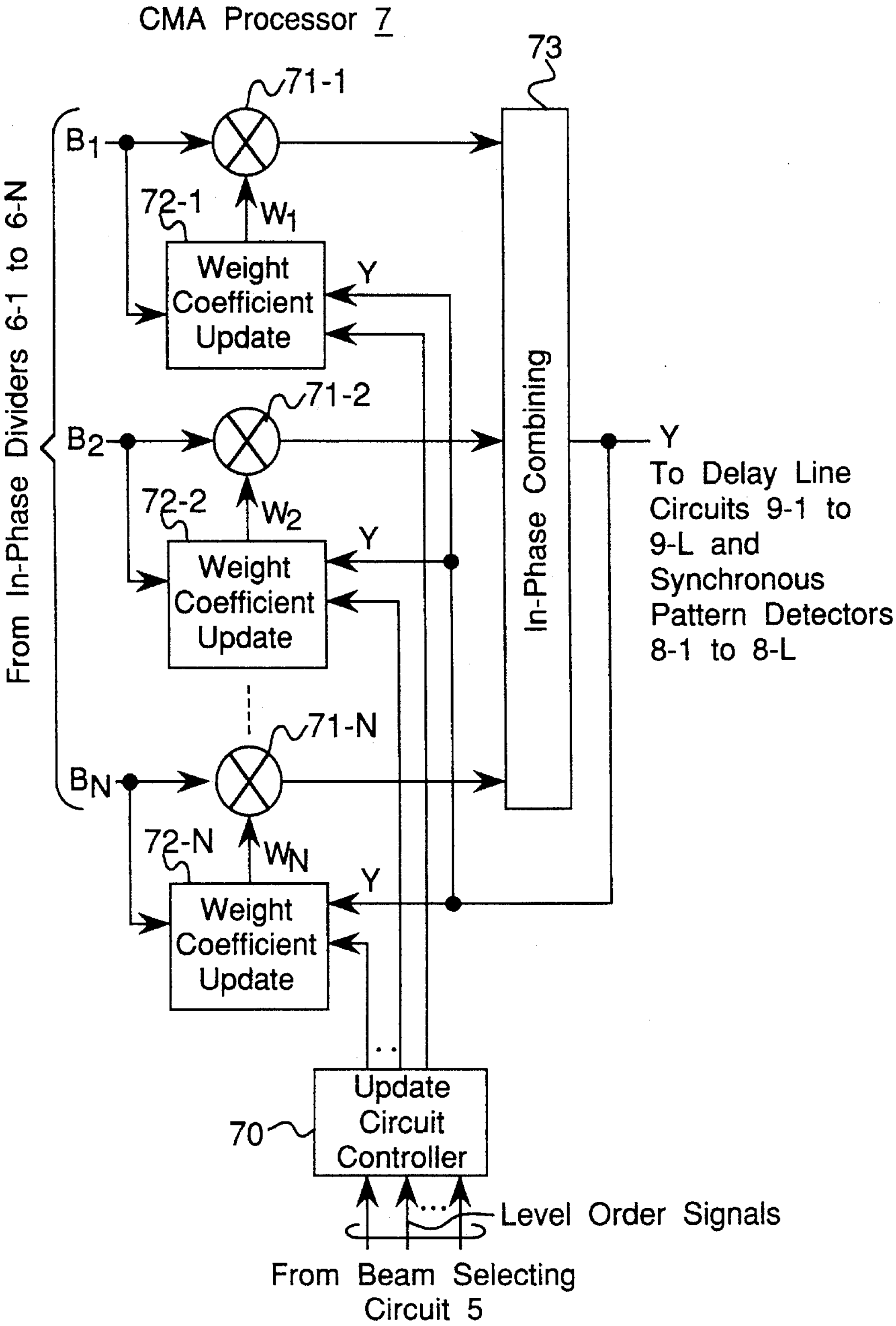
FIG. 3 is a block diagram of a CMA processor 7 shown in FIG. 1.

FIG. 3 is a block diagram of the CMA processor 7. Referring to FIG. 3, each of the CMA processors 7-1 to 7-L comprises a plurality of N multipliers 71-1 to 71-N, a plurality of N weight coefficient update circuits 72-1 to 72-N, an update circuit controller 70, and the in-phase combining circuit 73. The respective CMA processors 7-1 to 7-L are constituted in the same manner except for that the initial values of the weight coefficients are different from each other, as described in detail hereinafter.

The data signals of the beam field strengths $B_n$ (n=1, 2, 3, . . . , N) outputted from the in-phase dividers 6-1 to 6-N are inputted respectively to the multipliers 71-1 to 71-N and the weight coefficient update circuits 72-1 to 72-N. The multipliers 71-1 to 71-N respectively multiply the input data signals of the beam field strengths $B_n$ by the weight coefficients $w_1$ to $w_N$ outputted from the weight coefficient update circuits 72-1 to 72-N, and then outputs the data signal representing the multiplication result to the in-phase combining circuit 73. Then the in-phase combining circuit 73 combines in phase the plurality of N inputted signals, namely, sums them to each other in phase, and output the resulting data signal of combined electric field Y to not only delay line circuits 9-1 to 9-L and synchronous pattern detectors 8-1 to 8-L which are shown in FIG. 1 but also the weight coefficient update circuits 72-1 to 72-N.

Each of the weight coefficient update circuits 72-1 to 72-N executes the process represented by the above-mentioned Equation 6, namely, calculates the left side member of the Equation 6 based on the input data signals of the beam field strength $B_n$, the data signal of the combined electric field Y, and the weight coefficient $w_n^t$ at the previous sampling time so as to calculate the weight coefficient $w_n^{(t+1)}$ at the next sampling time for renewal and output the renewed weight coefficient to the multipliers 71-1 to 71-N. In accordance with the level order signal input from the beam selecting circuit 5, the update circuit controller 70 sets the weight coefficient $w_n$ outputted at the initial state time from a predetermined weight coefficient update circuit among the weight coefficient update circuits 72-1 to 72-N, to a predetermined initial value which is, for example, preferably 1 not 0, and also resets the weight coefficient $w_n$ outputted from the other weight coefficient update circuits to zero. In the initial state time, the update circuit controller 70 provided in the CMA processors 7-1 to 7-L controls the operations of the weight coefficient update circuits 72-1 to 72-N practically as follows.

(a) Since the CMA processor 7-1 is provided for detecting the direct wave and outputting the same direct wave, the update circuit controller 70 of the CMA processor 7-1 controls the weight coefficient update circuits 72-1 to 72-N so as to set to the above-mentioned predetermined initial value the weight coefficient $w_n$ outputted from the weight coefficient update circuit to which the data signal having the maximum beam field strength $E_n$ detected by the beam selecting circuit 5 is inputted, and so as to reset to zero the weight coefficients $w_n$ outputted from the other weight coefficient update circuits.

(b) Since the CMA processor 7-2 is provided for detecting the first delayed wave and outputting the same first delayed wave, the update circuit controller 70 of the CMA processor 7-2 controls the weight coefficient update circuits 72-1 to 72-N so as to set to the above-mentioned predetermined initial value the weight coefficient $w_n$ outputted from the weight coefficient update circuit to which the data signal having the second greater beam field strength $E_n$ detected by the beam selecting circuit 5 is inputted, and so as to reset to zero the weight coefficients $w_n$ outputted from the other weight coefficient update circuits.

(c) Since the CMA processor 7-3 is provided for detecting the second delayed wave and outputting the same second delayed wave, the update circuit controller 70 of the CMA processor 7-3 controls the weight coefficient update circuits 72-1 to 72-N so as to the above-mentioned predetermined initial value the weight coefficient $w_n$ outputted from the weight coefficient update circuit to which the data signal having the third greatest beam field strength $E_n$ detected by the beam selecting circuit 5 is inputted, and so as to reset to zero the weight coefficients $w_n$ outputted from the other weight coefficient update circuits.

(d) The update circuit controller 70 of the CMA processors 7-4 to 7-(L-l) controls the weight coefficient update circuits 72-1 to 72-N in the same manner as described above.

(e) Since the CMA processor 7-L is provided for detecting the (L-1)-th delayed wave and outputting the same (L-1)-th delayed wave, the update circuit controller 70 of the CMA processor 7-L controls the weight coefficient update circuits 72-1 to 72-N so as to set to the above-mentioned predetermined initial value the weight coefficient $w_n$ outputted from the weight coefficient update circuit to which the data signal having the minimum beam field strength $E_n$ detected by the beam selecting circuit 5 is inputted, and so as to reset to zero the weight coefficients $w_n$ outputted from the other weight coefficient update circuits.

In other words, the above-mentioned predetermined initial value being not zero such as the weight coefficient $w_n=1$ is given or set to only the data signal of the beam field strength having the n-th greatest received signal power by the n-th CM processor 7-n, while the weight coefficients $w_n$ for the data signals of the other beam field strengths are reset to zero by the same n-th CM processor 7-n. Thereafter, by executing the above-mentioned process according to the CM algorithm, the data signal of the combined electric field Y outputted from the CMA processors 7-1 to 7-L become respectively the data signal of the direct wave having the maximum beam field strength, the data signal of the first delayed wave having the second greater beam field strength, . . . , and the data signal of the (L-1)-th delayed wave having the L-th greatest beam field strength. In other words, the reception signal can be separated into the direct wave and a plurality of delayed waves through the above-mentioned process.

Referring back to FIG. 1, the structure and the operation of the in-phase diversity combining circuit including the CMA processors 7-1 to 7-L and the circuits subsequent thereto will be described in detail hereinafter.

Each of the synchronous pattern detectors 8-1 to 8-L detects the synchronous pattern signal from the inputted data signal, and then outputs a detection timing signal representing the detection timing of the synchronous pattern signal to a delay controller 10. The delay controller 10 controls the delay time of the delay line circuits 9-1 to 9-L so that the data signals inputted to the delay line circuits 9-1 to 9-L are in phase at the latest timing among the timings represented by a plurality of L inputted detection timing signals. Consequently, the respective data signals inputted to the in-phase combining circuit 11 are synchronized with the synchronizing pattern of the data signals so as to be in phase, and then a plurality of data signals inputted to the in-phase combining circuit 11 are combined in phase. This results in that the combined data signal is outputted as a reception baseband signal having the maximum noise-to-signal power ratio (S/N). In other words, a diversity reception is performed by the control apparatus.

Figure 4A:
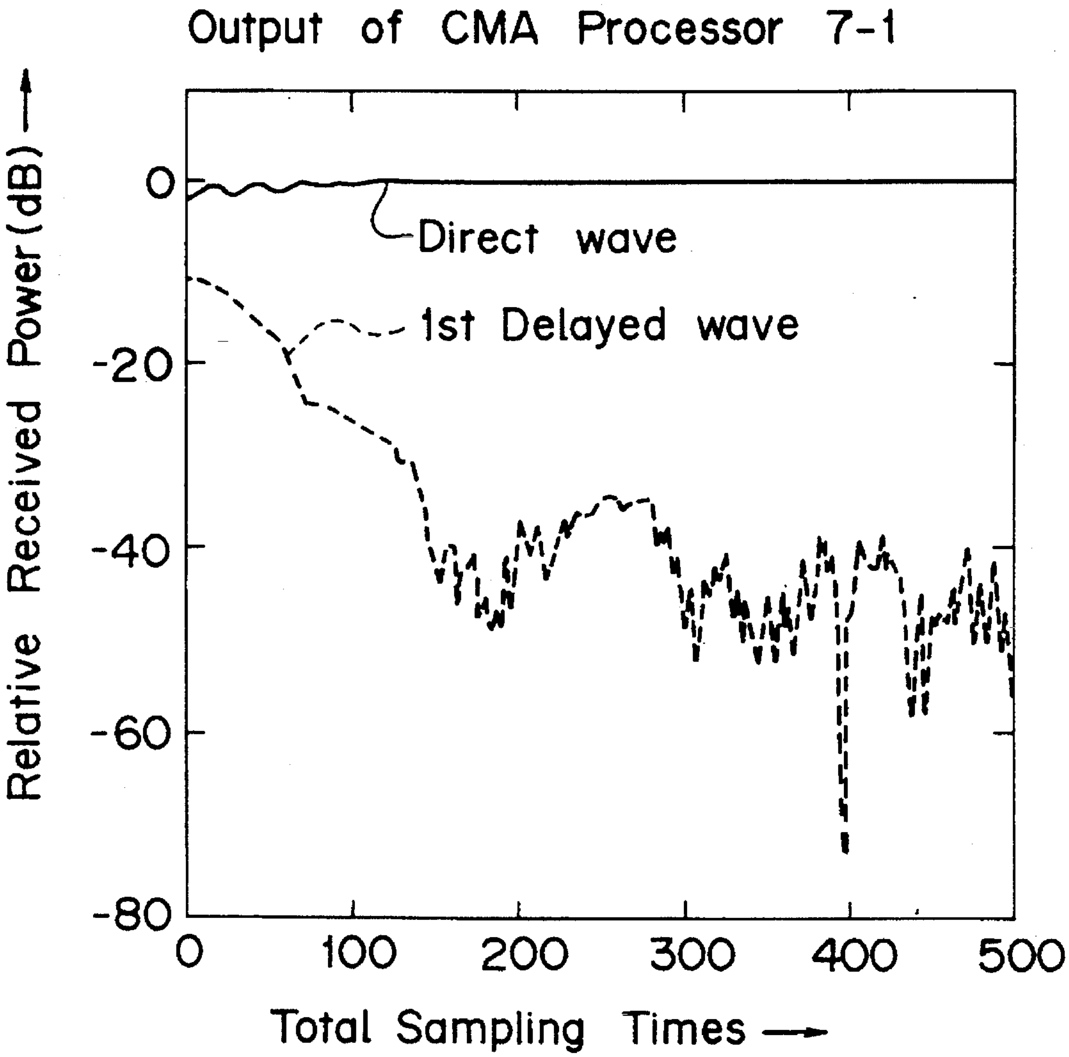
FIG. 4A is a graph showing a relative received signal power outputted from a CMA processor 7-1 with respect to elapse of the time as a result of a simulation of the control apparatus for the array antenna shown in FIG. 1.
Figure 4B:
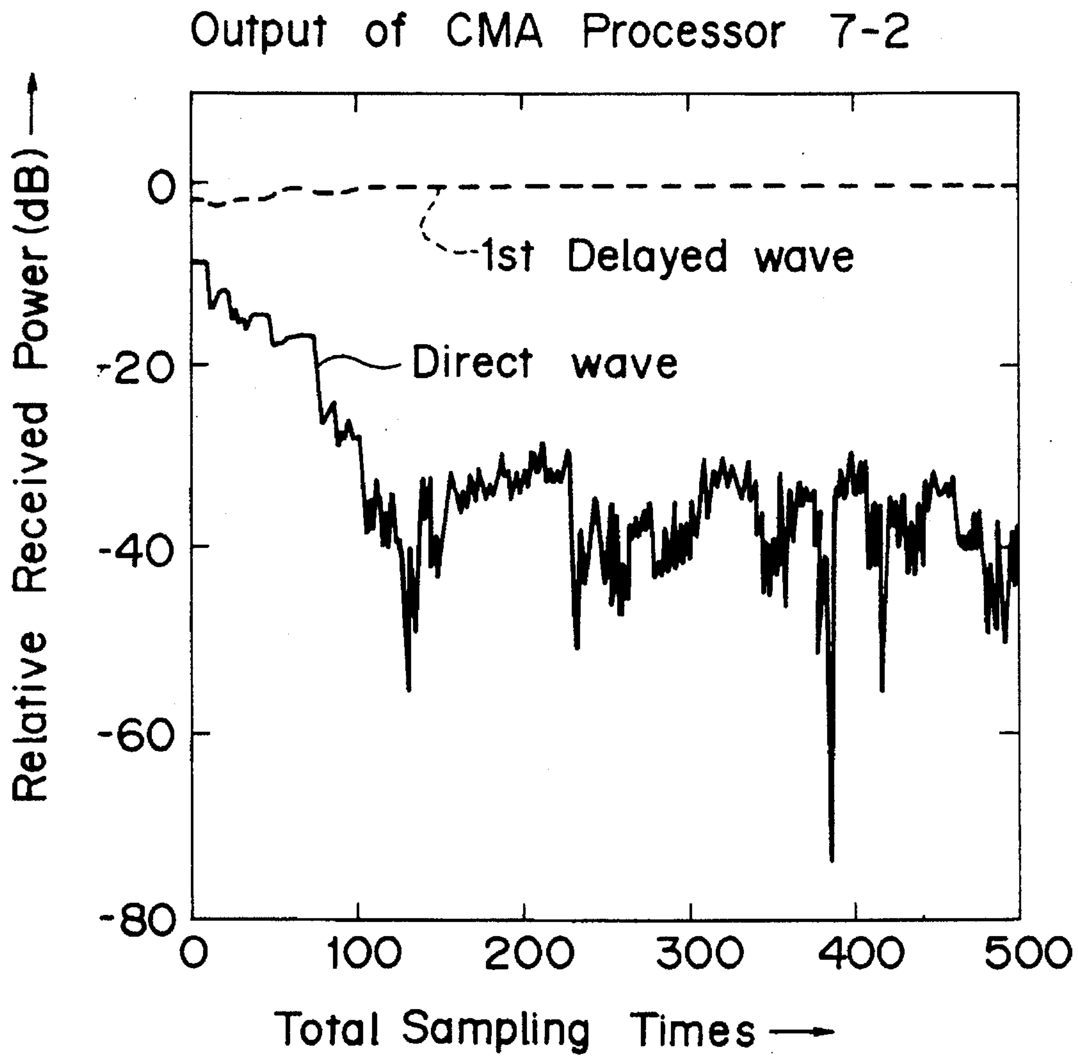
FIG. 4B is a graph showing a relative received signal power outputted from a CMA processor 7-2 with respect to elapse of the time as a result of a simulation of the control apparatus for the array antenna shown in FIG. 1.
Figure 5:
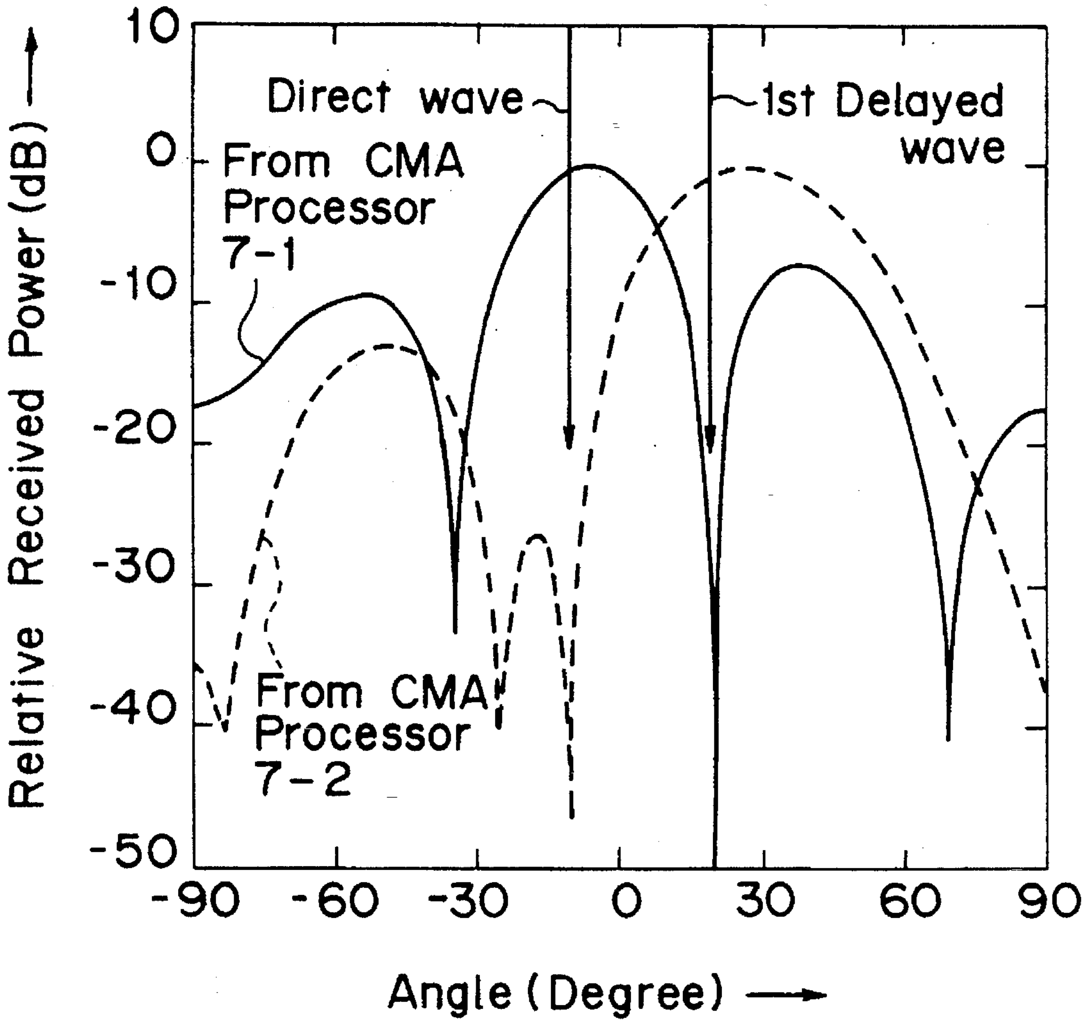
FIG. 5 is a graph showing a relative received signal power outputted from the CMA processors 7-1 and 7-2 with respect to an directing angle of an array antenna 1 shown in FIG. 1 as a result of a simulation of the control apparatus for the array antenna shown in FIG. 1.

FIGS. 4A and 4B are graphs respectively showing relative received signal powers outputted from the CMA processor 7-1 shown in FIG. 4A and a relative received signal power outputted from the CMA processor 7-2 shown in FIG. 4B with respect to elapse of the time as a result of a simulation of the control apparatus for the array antenna shown in FIG. 1. Further, FIG. 5 is a graph showing a relative received signal power outputted from the CMA processors 7-1 and 7-2 with respect to the directing angle of the array antenna 1 as a result of a simulation of the control apparatus for the array antenna shown in FIG. 1.

As is apparent from FIG. 4A, it can be found that a signal-to-noise ratio equal to or greater than 40 dB can be obtained at the time of the accumulative sampling times =150 at the output terminal of the CMA processor 7-1. As is apparent from FIG. 4B, it can be found that a signal-to-noise ratio equal to or greater than 30 dB can be obtained at the time of the accumulative sampling times=150 at the output terminal of the CMA processor 7-2. It can be further found that, during the time of convergence including the time of the accumulative sampling times=150 and the other period subsequent thereto, the direct wave and the first delayed wave are separately outputted from the CMA processors 7-1 and 7-2 by means of the control apparatus for the array antenna of the present preferred embodiment as shown in FIG. 5.

According to the present preferred embodiment as described above, in the case of executing the process of the adaptive array antenna according to the CM algorithm by selecting the beam field strengths equal to or greater than the above-mentioned predetermined threshold value after formation of the multi-beam by the known method, a plurality of CMA processors 7-1 to 7-L are provided. Then the direct wave and at least one delayed wave can be separately received by setting the initial values at the time of starting the calculations in the initial state time of the CMA processors 7-1 to 7-L according to the orders of the magnitude of the beam field strengths of the received signal powers of the multi-beam. With the above-mentioned arrangement of the present preferred embodiment of the present invention, the control apparatus for the array antenna of the present preferred embodiment has the following advantageous effects.

(a) Since at least two CMA processors are required to separate the direct wave and at least one delayed wave, the hardware structure of the control apparatus becomes simpler than that of the conventional example.

(b) Since the CM algorithm process can be executed by making a plurality of CMA processors operate in parallel, a predetermined signal-to-noise ratio can be obtained with a calculation time shorter than the time required in the conventional example. In other words, although the adaptive equalizer is made to operate so as to obtain a predetermined signal-to-noise ratio after a predetermined condition of convergence is satisfied in the process according to the algorithm of the adaptive array antenna in the conventional example in the above-mentioned manner, the present preferred embodiment requires no operation of the adaptive equalizer, thereby reducing the time required for the adaptive control processing by the time for the operation.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for adaptively controlling an array antenna comprised of a predetermined plurality of M antenna elements arranged closely to each other in a predetermined arrangement form, comprising:

multi-beam forming means for calculating a predetermined plurality of N beam field strengths based on a plurality of M reception signals received by the antenna elements of the array antenna, directions of respective main beams of a plurality of N beams to be formed which have been predetermined so that a desired wave can be received in a predetermined radiation angle, and a reception frequency of the reception signals;

beam selecting means for selectively outputting beam field strengths equal to or greater than a predetermined threshold value by comparing said plurality of N beam field strengths calculated by said multi-beam forming means, with the predetermined threshold value; and at least two adaptive control means for calculating a plurality of N weight coefficients for the reception signals corresponding to a plurality of N beams based on the beam field strengths outputted from said beam selecting means according to a constant modulus algorithm, respectively multiplying the calculated beam field strengths by a plurality of calculated N weight coefficients, combining,in phase respective signals of multiplication results obtained by said multiplication, and outputting the combined signal as a reception signal;

first initial value setting means for, in a predetermined initial state of said one adaptive control means, setting a weight coefficient of one adaptive control means corresponding to the maximum beam field strength among the beam field strengths outputted from said beam selecting means to a predetermined initial value being not zero, and setting weight coefficients corresponding to the other beam field strengths to zero; and second initial value setting means for, in a predetermined initial state of said other adaptive control means, setting a weight coefficient of said other adaptive control means corresponding to at least a beam field strength having the second greater level among the beam field strengths outputted from said beam selecting means to the predetermined initial value, and setting weight coefficients corresponding to the other beam field strengths to zero.

2. The apparatus as claimed in claim 1, further comprising:

synchronizing signal detecting means for detecting synchronizing signals in response to the reception signals outputted from said adaptive control means; and combining means for combining in phase the reception signal outputted from said one adaptive control means with the reception signal outputted from said other adaptive control means so as to perform a diversity reception based on the synchronizing signals detected by said synchronizing signal detecting means.

3. A method for adaptively controlling an array antenna comprised of a predetermined plurality of M antenna elements arranged closely to each other in a predetermined arrangement form, including:

calculating a predetermined plurality of N beam field strengths based on a plurality of M reception signals received by the antenna elements of the array antenna, directions of respective main beams of a plurality of N beams to be formed which have been predetermined so that a desired wave can be received in a predetermined radiation angle, and a reception frequency of the reception signals;

selectively outputting beam field strengths equal to or greater than a predetermined threshold value by comparing said calculated plurality of N beam field strengths with the predetermined threshold value; and calculating a plurality of N weight coefficients for the reception signals corresponding to a plurality of N beams based on said selectively outputted beam field strengths outputted according to a constant modulus algorithm, respectively multiplying the calculated beam field strengths by a plurality of calculated N weight coefficients, combining in phase respective signals of multiplication results obtained by said multiplication, and outputting the combined signal as a reception signal;

in a predetermined initial state of one adaptive control means for performing said calculating a plurality of N weight coefficients step, setting a weight coefficient of said one adaptive control means corresponding to the maximum beam field strength among said selectively outputted beam field strengths to a predetermined initial value being not zero, and setting weight coefficients corresponding to the other beam field strengths to zero; and in a predetermined initial state of said other adaptive control means which is different from said one adaptive control means and performs said calculating a plurality of N weight coefficients step, setting a weight coefficient of said other adaptive control means corresponding to at least a beam field strength having the second greater level among said selectively outputted beam field strengths to the predetermined initial value, and setting weight coefficients corresponding to the other beam field strengths to zero.

* * * * *